United States Patent
Regan

(10) Patent No.: US 8,605,889 B2
(45) Date of Patent: Dec. 10, 2013

(54) METHOD AND DEVICE FOR ENCODING CHARACTERS AND ROUTING CALLS USING EXPANDED DUAL-TONE MULTI-FREQUENCY (DTMF) ENCODING SCHEME

(76) Inventor: Edward D. Regan, Micco, FL (US)

(*) Notice: Subject to any disclaimer, the term of this patent is extended or adjusted under 35 U.S.C. 154(b) by 0 days.

(21) Appl. No.: 13/299,738

(22) Filed: Nov. 18, 2011

(65) Prior Publication Data

US 2013/0129077 A1    May 23, 2013

(51) Int. Cl.
*H04M 1/00* (2006.01)
*H04M 11/00* (2006.01)

(52) U.S. Cl.
USPC ......................................... 379/368; 379/93.27

(58) Field of Classification Search
None
See application file for complete search history.

(56) References Cited

U.S. PATENT DOCUMENTS

| | | | |
|---|---|---|---|
| 3,699,477 A | | 10/1972 | McKell |
| 4,799,254 A | * | 1/1989 | Dayton et al. ............. 379/93.26 |
| 5,249,220 A | * | 9/1993 | Moskowitz et al. ........ 379/93.19 |
| 5,561,710 A | * | 10/1996 | Helms ......................... 379/93.27 |
| 5,682,421 A | * | 10/1997 | Glovitz et al. ........... 379/100.05 |
| 5,790,644 A | | 8/1998 | Kikinis |
| 5,903,832 A | * | 5/1999 | Seppanen et al. .......... 455/435.3 |
| 6,243,460 B1 | * | 6/2001 | Bhagavatula ................. 379/368 |
| 6,751,303 B1 | * | 6/2004 | Cook .......................... 379/93.27 |
| 6,868,145 B1 | * | 3/2005 | Nelson ........................ 379/93.09 |
| 2005/0105497 A1 | * | 5/2005 | Belkin et al. .................. 370/338 |
| 2006/0029211 A1 | * | 2/2006 | Mow ............................... 379/386 |
| 2009/0016501 A1 | * | 1/2009 | May et al. ................... 379/93.09 |
| 2009/0124291 A1 | * | 5/2009 | Cha ................................ 455/564 |
| 2010/0048191 A1 | * | 2/2010 | Bender et al. ................. 455/416 |
| 2011/0173558 A1 | * | 7/2011 | Yeh et al. ....................... 715/773 |

FOREIGN PATENT DOCUMENTS

| | | |
|---|---|---|
| DE | 200 17 787 U1 | 3/2001 |
| WO | 94/27397 | 11/1994 |

OTHER PUBLICATIONS

"Information Awareness Proposer Information Pamphlet".
"Telephone Dialing and Signaling Tones".
LingoNow.com: Phone Touch Tone/DTMF Tones.
International Search Report for corresponding PCT application PCT/US2012/065198.

\* cited by examiner

*Primary Examiner* — Simon Sing
*Assistant Examiner* — Jeffrey Lytle
(74) *Attorney, Agent, or Firm* — Davis & Bujold, PLLC; Michael J. Bujold

(57) ABSTRACT

A dual-tone generating telecommunication device comprising a frequency generating element that produces at least 9 individual tones, each having a distinct frequency between 300 Hz and 3,000 Hz, and at least 17 dial buttons, with each dial button representing at least one distinct character, and where each character directs the frequency generating element to produce a distinct dual tone, with each distinct dual tone being generated by the combination of two different individual tones.

19 Claims, 3 Drawing Sheets

METHOD AND DEVICE FOR ENCODING CHARACTERS AND ROUTING CALLS USING EXPANDED DUAL-TONE MULTI-FREQUENCY (DTMF) ENCODING SCHEME

FIELD OF THE INVENTION

The present invention relates to a novel telecommunication method and device for generating and utilizing dual tones.

BACKGROUND OF THE INVENTION

Wired phones generate Dual Tone Multi Frequency (DTMF) signals for communicating between phones, other communication devices, and respective switching centers. There are presently sixteen dual tones assigned to the ten digits, #, *, and A-D keys on phones—with the A-D keys normally being present only on select military and government phones—for dialing phone numbers into a phone to place a call. One problem with the current phone system's seven digit phone numbers though, is that there are only around 8,000,000 possible phone numbers in any given area code to assign to a new phone. This limited number, combined with the proliferation of new phones, leads to an exhausting of area codes and a shortage of new numbers.

SUMMARY OF THE INVENTION

Wherefore, it is an object of the present invention to overcome the above mentioned shortcomings and drawbacks associated with the prior art.

Another object of the present invention is a device and a method of dialing using the 94 printable characters and the space bar, found on a standard "QWERTY" keyboard, with its 26 lower case letters, 26 upper case letters, at least 32 symbols and punctuation marks, and the 10 digits, to generate DTMF signals.

A further object of the present invention is to expand the existing dialing system in the Public Switched Telephone Network. Telephonic devices already in public use, digital computers and future devices could use these expanded dual-tones to transmit dialing signals and secondary post dialing signals requested by called communication systems. Software "patches" would be required in the existing network nodes so as to recognize these new dual-tones.

Yet another object of the present invention is to potentially decrease switching time in the Signaling System No. 7 (SS7), by allowing a phone user to chose use any number of characters, from 1 to 15, to construct an individual telephone address.

A still further object of the present invention is to provide that residential phones could use one of ASCII and EBCDIC encoding, and/or secure, government, and military phones, could use the other of ASCII and EBCDIC encoding. ANSI X3.4-1986 coding could also be used in either situation. Additionally, a given number of characters between 1 and 22 and preferably between 16 and 20 could be reserved for business secure, government, and military phones only.

Yet another further object of the present invention is to provide that each telephone unit could have a signature which would be useful in determining location of the unit; useful in follow-up investigation.

Yet another still further object of the present invention is to provide a telephone unit that is ideally compatible with the standards of the ITU (International Telecommunications Union of the United Nations), the IEEE (Institute of Electrical and Electronics Engineers), the FCC (Federal Communications Commission), the NARUC (National Associating of Regulatory Utility Commission), the NANPA (North American Numbering Plan Administration), and the ISO (International Standards Organization), with such standards and regulations being incorporated into the disclosure of this application as if fully restated herein.

The present invention also relates to a dual-tone generating telecommunication device comprising a frequency generating element that produces at least 9 individual tones, each having a distinct frequency between 300 Hz and 3,000 Hz, and at least 17 dial buttons, with each dial button representing at least one distinct character, and where each character directs the frequency generating element to produce a distinct dual tone, with each distinct dual tone being generated by the combination of two different individual tones.

The present invention also relates to a method of sending data from a dual-tone generating telecommunication device comprising a frequency generating element that produces at least 9 individual tones, each having a distinct frequency between 300 Hz and 3,000 Hz; at least 17 dial buttons, with each dial button representing at least one distinct character; each character directing the frequency generating element to produce a distinct dual tone, with each distinct dual tone being generated by the combination of two different individual tones; and a queue; the method comprising the steps of encoding one or more character into a queue; generating a distinct dual tone for each character; transmitting the distinct dual tones to a telecommunications network The present invention also relates to a method of increasing the speed of a dialing system. The digits inserted may be transmitted in a burst to the SS7 when the "send" button is pressed.

BRIEF DESCRIPTION OF THE DRAWINGS

The invention will now be described, by way of example, with reference to the accompanying drawings in which.

DETAILED DESCRIPTION OF THE INVENTION

Figure 1:
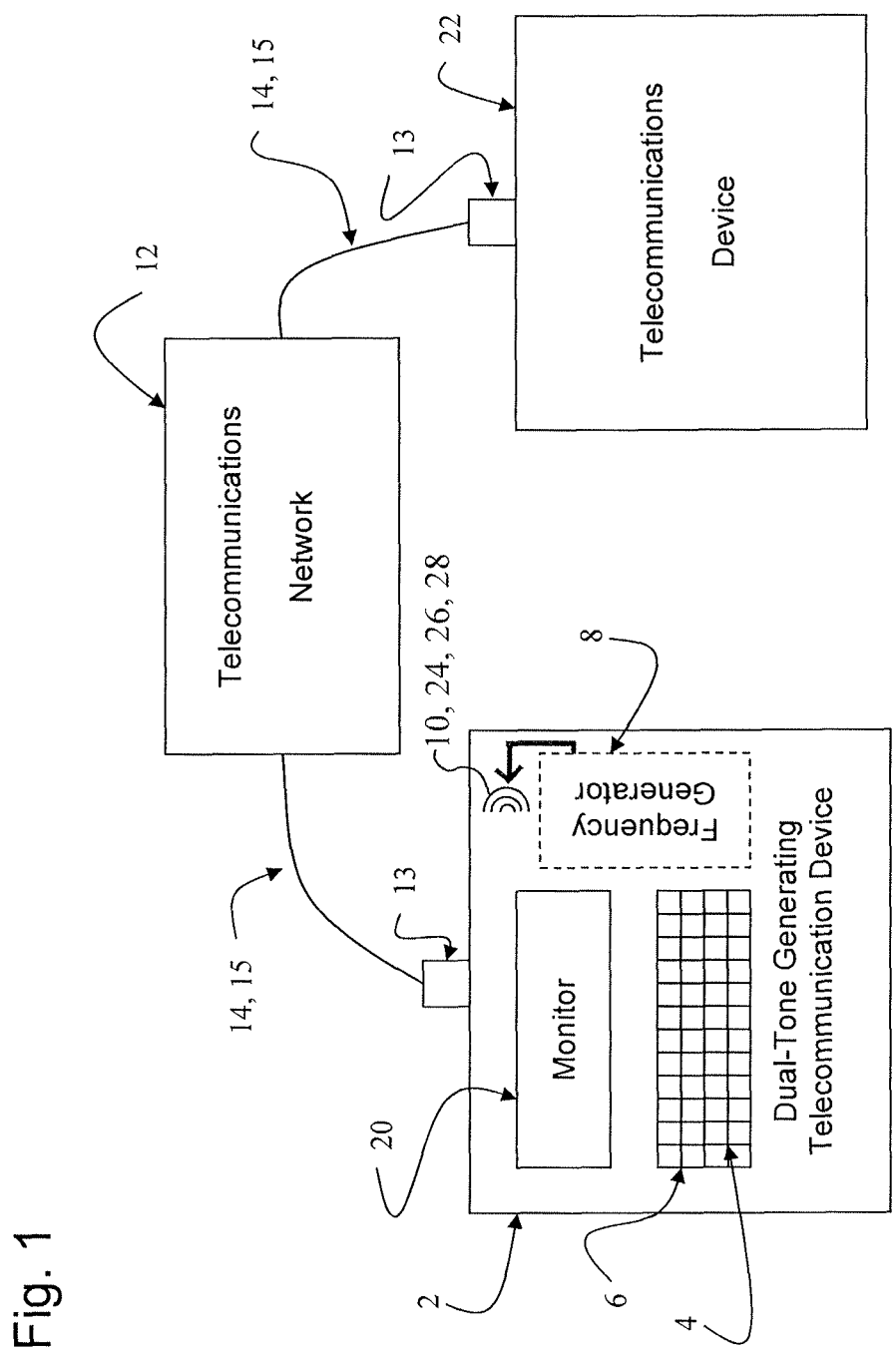
FIG. 1 is a schematic representation of a dual tone multi frequency device according to the disclosed invention.

Turning now to FIG. 1, a brief description concerning the various components of the present invention will now be briefly discussed. As can be seen in this embodiment, a dual tone multi frequency device 2 comprises a plurality of dial buttons 4 on a dial pad 6, and a frequency generating element 8. The frequency generating element 8 is capable of generating a number of different distinct single tones 10, with each distinct single tone 10 preferably having a frequency between 300 Hz and 3,000 Hz, though the frequency could be lower than 300 Hz and higher than 3,000 Hz. The frequency generating element 8 can generate at least two distinct single tones 10 simultaneously, and can potentially generate three or four or more distinct single tones 10 simultaneously.

The dual tone multi frequency device 2 is connected to the public switched telephone network, or other telecommunications network 12 using a phone jack, a wireless transmitter/receiver, or other electronic connection 13 via a wired connection 14, similar to land phone, via a wireless electromagnetic radiation connection 15 and wired connection 14, similar to a cordless phone, or via a cell site, base transceiver station, cellular tower or other connection, similar to a cell phone. Additionally, the dual tone multi frequency device 2 may be connected to the telecommunications network 12 via a USB or other connection to a computer, or via WiFi or other cordless data connections to the telecommunications network 12. Preferably, though, the dual tone multi frequency device 2 should still be functional when a computer is turned off.

The dial pad 6 has at least forty-six dial buttons 4, including many of the keys from the standard "QWERTY" keyboard. Each dial button 4 could encode one or two separate characters 16, with the space bar likely only encoding the space character 16. For example, the "A" dial button 4 could encode both the lower case "a" character 16 when pressed alone, and the upper case "A" character 16 when both the "A" dial button 4 and the "Shift" function button 18 (see FIG. 3) are depressed, either together of sequentially. Similarly, the "6" dial button 4 could encode the number "6" character 16 when pressed alone, and also the caret symbol "^" character 16 when both the "6" dial button 4 and the "Shift" function button 18 are depressed.

Figure 2:
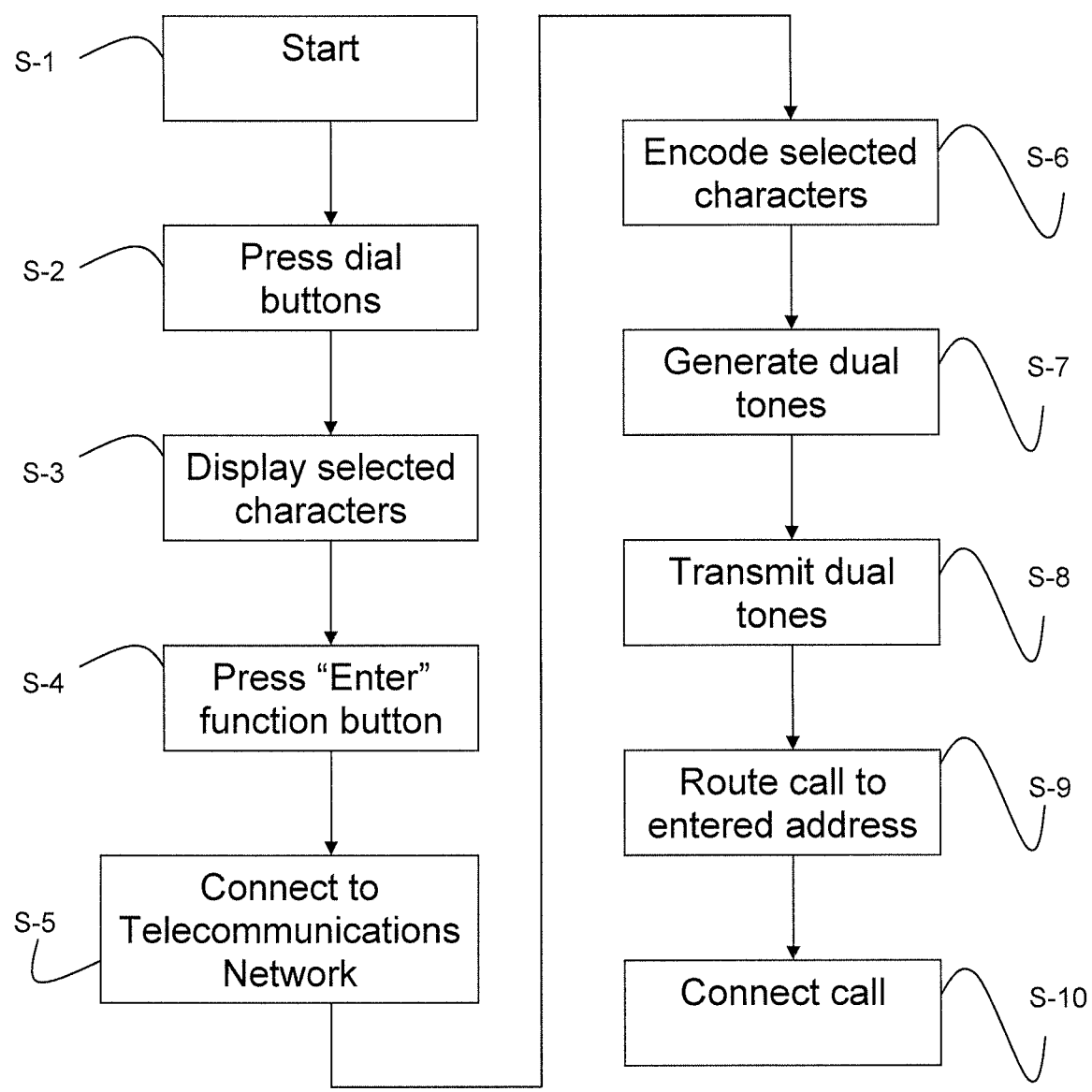
FIG. 2 is a flow chart diagram of a method of using the device of FIG. 1.

As shown in FIG. 2, upon initiating the process (see step S-1), when a given character 16 is selected (see step S-2), it is ideally displayed on an attached monitor or display 20 (see step S-3). Therefore, when the dial buttons 4 and "Shift" function button 18 are pressed in the following sequence: "Shift"+"N", "Shift"+"H", "Spacebar", "Shift"+"F", "O", "O", "T", "B", "A", "L", "L", the characters 16 "NH Football" are encoded and displayed on the display 20. When the user has entered the full phone address of another telecommunications device 22 the user wishes to connect to, the user will then press a "Send" or "Enter" function button 18 to initiate the call (see step S-4). The dual tone multi frequency device 2 will then connect to the telecommunications network 12 (see step S-5). The frequency generating element 8 of the dual tone multi frequency device 2 will then encode and generate the dual tones 24 associated with encoded characters 16 and transmit the dual tones 24 from the dual tone multi frequency device 2 to the connected telecommunications network 12 (see steps S-6 to S-8). The other telecommunications device can include a telephone, mobile phone, computer, routing device, system switch, system node, routing node, and network node, and the user may connect to or be routed through multiple telecommunication devices in a single call.

The dual tones 24 will be received by the caller's central office, which will analyze the characters 16 encoded for validity of the characters 16 and the length of the string. If the string has invalid entries or is of invalid length, either nothing happens, or a message may follow, such as "your call cannot be completed as dialed". If the encoded address is valid, the caller's central office analyzes the system for its best routing, and forwards the signals to the destination address' home central office. The destination central office then sends a ringing signal to the destination port (see step S-9). As the recipient picks up their telecommunications device 22, the destination central office receives the off-hook condition signal and completes the connection phase of the call (see step S-10). During this last step, the messaging is transferred from the dialing circuitry to the communication circuitry.

Figure 3:
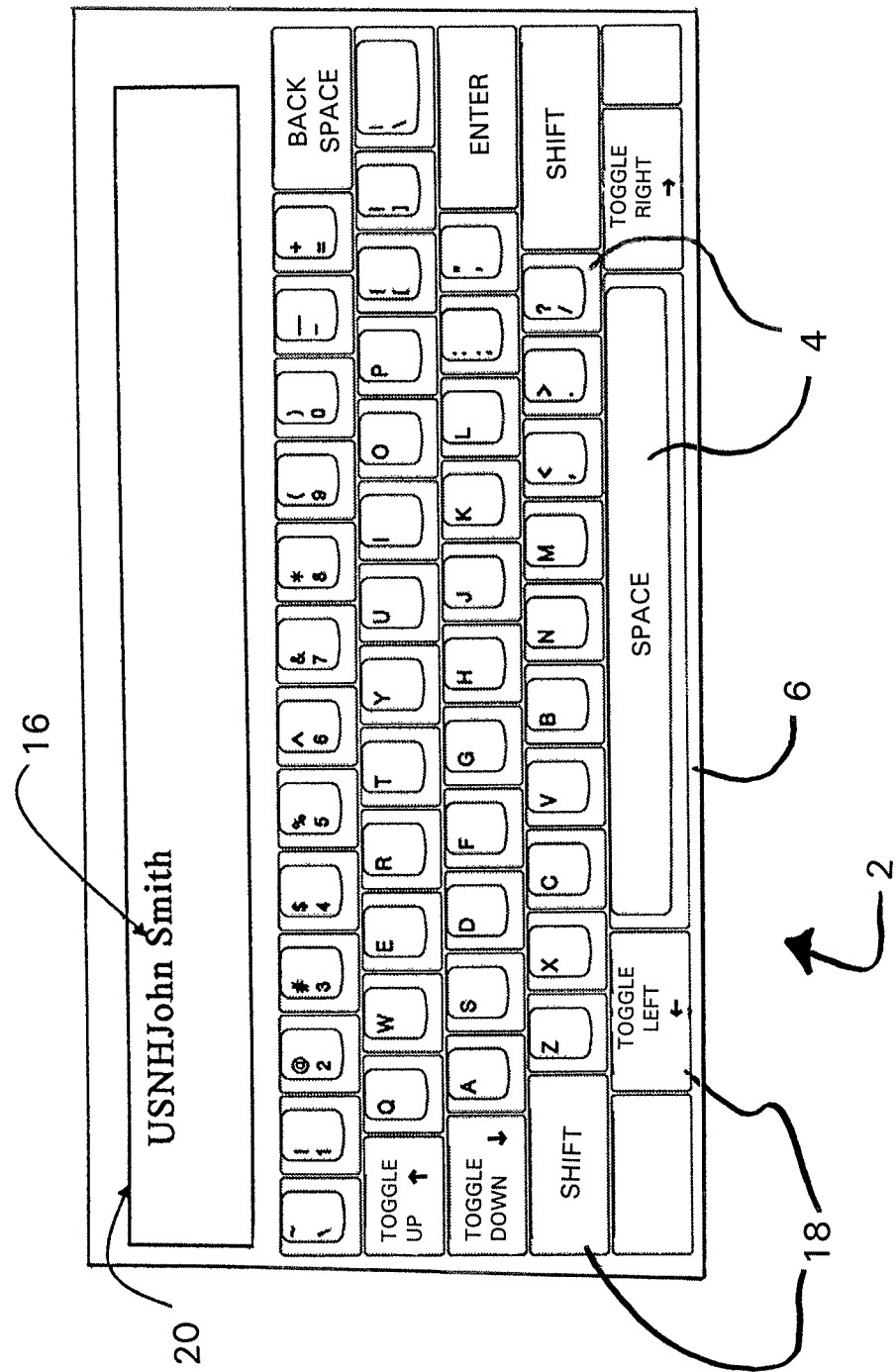
FIG. 3 is a detailed view of a dial pad of the device of FIG. 1.

Turning now to FIG. 3, a dial pad 6, including many of the keys from a standard "QWERTY" keyboard, is shown. Such an extensive selection of dial buttons 4 and function buttons 18 (such as "Shift", "Enter", and toggle up, down, left, and right) will facilitate the entry of the plurality of characters 16 utilized in the dual tone dialing system. Additional function buttons 18 (e.g., "Ctrl", "Alt", etc) could be provided to facilitate additional vertical services, which that could be engaged by entering a combination of function buttons 18 and/or dial buttons 4. Such additional vertical services would include management of "smart house" functions, or communication with and control of other devices the dual tone multi frequency device 2 is connected to or networked with. Additionally, there could be specific function buttons 18, such as an information button, that if pressed contacts information, and an emergency button that if pressed contact "911", or other local emergency services, either directly, or indirectly by displaying an emergency menu that offers a selection of buttons 18 to press for the respective emergency service for the user to connect to. Other function or menu keys could also be utilized for other purposes to increase the utility of the device, such as messaging, screen options, managing a calling list, and the like.

In the embodiment shown, each dial button 4 will encode for two distinct characters 16, with the space bar only encoding for the space character 16. Each character 16 though, can be encoded by depressing single dial button 4 only once, or by both depressing a single dial button 4 and a single function button 18 only once. As each character 16 will be associated with at least one distinct dual tone 24 combination, these 95 characters 16 require at least 95 separate dual tone 24 combinations. To create these at least 95 dual tone 24 combinations, 15 distinct single tones 10 could combine into 105 distinct dual tone 24 combinations sufficient to encode the 95 characters 16, with each dual tone 24 being comprised of two separate single tones 10. This number of distinct dual tones 24 is reached by using the formula: $[n!/(r!*(n-r)!)]$, where n equals the number of single tones 10 (fifteen in this case), and r equals the number of single tones 10 used in each dual tone 24 combination (two in the case of dual tones).

Alternatively, the distinct dual tones 24 could be formed from a combination of one of a group of lower tones 26 and one of a group of higher tones 28. In the embodiment with 95 characters 16, 20 separate single tones 10 could be used, where 10 lower tones 26 were combined with 10 higher tones 28, to create 100 separate dual tone 24 combinations of one of the group of lower tones 26 and one of the group of higher tones 28. This number of distinct dual tones 24 is reached by using the formula: $[n^2/4]$, where n equals the number of single tones 10 (20 in this case). While using low and high tone 26, 28 combinations to encode the characters 16 requires more single tones 10 to create the required number of distinct dual tones 24, this approach does provide an increased average distance between the two single tones 10 in a dual tone 24 combination, potentially allowing for greater fidelity of the of the dual tones 24 decoding by additional telecommunication devices 22, at one or more locations along the path of the call.

If lower case and upper case letters were not differentiated, that is, if they were encoded with the same dual tone 24, and, for example, the encoding for "CAT" and "cat" were the same, 69 characters 16 would be represented by the dial pad 6 in FIG. 3. Using the same formulas as above, to create these at least 69 dual tone 24 combinations, 13 distinct single tones 10 could combine into 78 separate dual tone 24 combinations, sufficient to encode the 69 characters 16, with each dual tone 24 being comprised of two separate single tones 10. Alternatively 18 separate single tones 10 could be used, where 9 lower tones 26 were combined with 9 higher tones 28, to create the 81 separate dual tone 24 combinations of one lower tone 26 and one higher tone 28.

Other characters 16 can be encoded, in addition to those described above and shown in FIG. 3, either to correspond with separate/interchangeable dial pads 6 on the same dual tone multi frequency devices 2, or separate languages on the same dial pad or separate dual tone multi frequency devices 2.

This can be for languages that use different alphabets or additional letters other than English, e.g., Arabic, Chinese, Hindi, and Russian, or for use with different professions, or government or military uses, that will have specialized symbols or code characters 16. To allow one system to encode distinct and unique dual tones 24 for a variety of characters 16 and symbols from multiple languages, at least 112 distinct single tones 10 between 300 Hz and 3,000 Hz could combine into 6,216 separate dual tone 24 combinations, sufficient to encode 6,216 characters 16, with each dual tone 24 being comprised of two separate single tones 10. Alternatively the at least 112 separate single tones 10 could be separated into 56 lower tones 26 (having the smaller frequencies) and 56 higher tones 28 (having the larger frequencies). Together, the 56 lower tones 26 and 56 higher tones 28 could create 3,136 separate dual tone 24 combinations of one lower tone 26 and one higher tone 28, sufficient to encode 3,136 characters 16. The frequency for any one separate single tone 10 would preferably be at least 1.5% higher than the frequency of a previous respective separate single tone 10.

Additionally, at least two types of dual tone multi frequency devices 2 may be used, a normal security residential version, and a higher security business/government version. The higher security business/government version could have access to, that is generate, certain additional dual tone 24 that the residential phones would not have access to or be able to generate This would thus help to increase the security of the military/government/business infrastructure. Also, the dual tone multi frequency devices 2 could have individual signatures on each device 2, a potentially factory built in identifier with each device 2. The signatures could be of the same format, or preferably could be of a different format between the normal security residential version, and the higher security business/government version. The signatures could be similar to an subscriber identity module in a cell phone, and could be on a removable card, or integrated as part of the internal circuitry of the dual tone multi frequency devices 2.

In the character 16 dual tone 24 encoding, it is envisioned that the numbers 0-1, the *, and # symbols, and the capital letters "A"-"D" would retain the same dual tone 24 combinations as in existing DTMF phones. A table of the existing dual tone 24 combinations is below:

|        | 1209 Hz | 1336 Hz | 1477 Hz | 1633 Hz |
|--------|---------|---------|---------|---------|
| 697 Hz | 1       | 2       | 3       | A       |
| 770 Hz | 4       | 5       | 6       | B       |
| 852 Hz | 7       | 8       | 9       | C       |
| 941 Hz | *       | 0       | #       | D       |

By retaining the current dual tone 24 encoding of the ten numerals, two symbols and four letters for the disclosed dual tone multi frequency device 2 and method, it would allow the dual tone multi frequency device 2 to more readily integrate into the current system, and ease the way for the current system to transition to the inventive dialing method described herein. The dual tone 24 encoding for the remaining characters 16 could be based upon the total number of additional characters 16 that are to be encoded. If a subscriber wishes to retain his existing phone number, he can.

One of the features of the dual tone multi frequency device 2 is that by expanding the number of available distinct characters 16 that can be dialed, the potential number of phone addresses could also expand, and exponentially so. Present phone addresses are comprised of country codes, three digit area codes, and seven digit local numbers. The seven digit local numbers are comprised of three digit exchanges/prefixes and four digit subscriber numbers. Because the "zero" and "one" digits are not used as the leading digit of local numbers, the number of phone addresses available in a given area code is less than 8,000,000. If the seven character 16 local number format was retained, and the "zero" and "one" digits refrained from being used as the leading digit, then using all the available letters/numbers/symbols encoded by the 95 character 16 embodiment of the dual tone multi frequency device 2 would expand that number 8,000,000 number to $95^6 \times 93$. That is, approximately $5.68 \times 10^{19}$ available seven character 16 phone addresses per area code—approximately 70 trillion times more seven character 16 addresses than the current system.

Different alternatives could maximize the effectiveness of a phone address system utilizing the increased character 16 capability of the dual tone multi frequency device 2. In one alternative, users would be allowed to choose their own phone address, with lengths varying from 1 to 15 characters 16 long.

Another alternative would have the two and three character 16 United Nations ISO ALPHA-2 and 3 codes used as the country code for dialing international calls. The existing area codes could be retained, or all the phone addresses in a state or territory could use the two character 16 United States Postal Service state abbreviations for interstate calls. If desired, county/parish and/or city/town/village abbreviations could be incorporated as an additional prefix.

For example, the full phone address for an individual in New Hampshire named John Smith, who chose "John Smith" as his phone address could be "USANHJohn Smith". People calling John Smith from within New Hampshire would merely input "John Smith" into their dual tone multi frequency device 2 and press the "Enter" function button 18, and they would be connected with John Smith. Individuals calling from within the United States but outside New Hampshire would input the "NH" prefix in before the local phone address "John Smith", while individuals calling from outside the United States would input the "USANH" prefix before the local phone address.

A leading "1" or other number, letter or symbol could be used to signify that an international or an interstate call is being placed, or a first separate number, letter or symbol, such as "+", could be used to indicate an international call is being placed, and/or a second separate number, letter or symbol could be used to indicate an interstate call is being placed, and/or a third separate number, letter or symbol could be used to indicate an local call is being placed.

Special code numbers, such as "911" for emergency and "411" for information could be retained, and additionally, new codes could be added. For example, "PD" could route to the local police department, "FD" could route to the local fire department, and "INFO" could connect the user with information, the same as "411".

The multiple "8XX" toll free area codes could be retained and expanded, so that the companies who previously chose phone addresses that "spell" particular words or phrases, could now chose a toll free number with the actual word or phrase. For example 1800-356-9377 spells the phone address 1800-FLOWERS. Using the proposed method with the dual tone multi frequency device 2 would allow both the numeric and the alpha characters 16 to ring the same company.

The dual tone 24 multi frequency signals have both dialing and post dialing applications, first to route a call, and second to communicate with target systems once a call is connected. Although dual tone 24 sounds are made in cellular phones when the buttons are pressed, many cellular phones signal via digital signals. These cellular phones continue to encode dual tones 24 though, either directly in the phone or indirectly in the cellular system as directed by the phone user, so that a caller can communicate with a "target" system, e.g. when a user is asked. "press 1 for English, 2 to speak with a representative," etc. These "post dialing" applications used by businesses could also potentially expand as the number of characters 16 expands, allowing users to quickly and easily enter whole paragraphs of dual tone 24 encoded characters 16.

Ideally, the dual tone multi frequency device 2 would be backward compatible with current phones and phone systems. A traditional telephone could dial a code, and then a traditional numeric phone number assigned to a dual tone multi frequency device 2 user. A dual tone multi frequency device 2 user could either just dial a traditional phone user's phone address, or the dual tone multi frequency device 2 user could press a button or a mode switch on the dual tone multi frequency device 2, or enter a code that switches the dual tone multi frequency device 2 between the expanded alpha/numeric/symbol system, to a traditional phone dialing system. The users of dual tone multi frequency devices 2 might initially have a separate area code, especially for traditional telephones to connect with them.

A further embodiment would enable dual tone multi frequency device 2 to recognize vocal instructions and input. Such voice recognition ability would potentially allow for the dual tone multi frequency device 2 to encode characters 16 without the need for a dial pad 6 or dial or function buttons 4, 18.

In the above description and appended drawings, it is to be appreciated that only the terms "consisting of" and "consisting only of" are to be construed in the limitative sense while all other terms are to be construed as being open-ended and given the broadest possible meaning.

Since certain changes may be made in the above described improved dual tone multi frequency device 2 and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A dual-tone generating telecommunication device comprising:
    a frequency generating element that produces at least 9 individual tones, each having a distinct frequency between 300 Hz and 3,000 Hz;
    at least 17 dial buttons, with actuation of each dial button causes an encoding of at least one distinct character; and
    the encoding of each character directs the frequency generating element to produce a distinct dual tone, with each distinct dual tone being generated by the combination of two different individual tones and at least 95 characters are each encoded with a distinct dual tone combination of less than 20 individual tones;
    the distinct dual tones generated for characters A, B, C, and D are at frequencies of 1633 Hz & 697 Hz; 1633 Hz & 770 Hz; 1633 Hz & 852 Hz; and 1633 Hz & 941 Hz, respectively.

2. The device according to claim 1, wherein each character being one of numeral, a letter, and a symbol, and the encoding of uppercase characters A, B, C, and D directs the frequency generating element to produce only dual tone frequencies of 1633 Hz & 697 Hz; 1633 Hz & 770 Hz; 1633 Hz & 852 Hz; and 1633 Hz & 941 Hz, respectively.

3. The device according to claim 2, wherein each symbol being one of—! @ # $ % , ˆ & * ( ) - = + [ { ] }\ | ; : ' " , < . > / and ?—.

4. The device according to claim 1, wherein each character is one of a numeral, an upper case letter, a lower case letter, a symbol, and a space.

5. The device according to claim 1, wherein each dial button represents one of one, two, and three characters, with each character being one of numeral, a letter, and a symbol.

6. The device according to claim 1, further comprising
    at least 36 dial buttons; and
    the sound generating element produces at least 15 individual tones, and
    at least 95 dual tones are produced by at least 95 distinct combinations of between 15 and 19 individual tones.

7. The device according to claim 1 wherein the sound generating element produces at least 20 individual tones, comprised of 10 low tones and 10 high tones, each individual tone having a distinct frequency between 300 Hz and 3,000 Hz, and each dual tone is distinct combination of one of the low tones and one of the high tones.

8. The device according to claim 1 wherein at least 36 characters are represented by the dial buttons;
    the sound generating element produces at least 112 individual tones, each having a distinct frequency between 300 Hz and 3,000 Hz;
    a phone cord jack accepts a phone cord attached to the device and allows the device to send and receive data through the phone jack to a telecommunications network; and
    the device is one of a land phone, a cell phone, a modem, and a codec,
    wherein a plurality of dual tones are generated, which represent a telephonic address for a separate device, and the plurality of dual tones generated are transmitted from the device to a telephonic network allowing the device to be connected to the separate device and a call to be initiated.

9. The device according to claim 1 wherein
    at least 95 characters are represented by the dial buttons,
    the sound generating element produces at least 15 individual tones;
    each individual tone having a distinct frequency between 300 Hz and 3,000 Hz,
    at least 95 dual tones are produced by at least 95 distinct combinations of the at least 15 individual tones,
    each of the at least 95 dual tones representing a character; and
    the at least 95 dual tones including dual tone combinations of each of the at least 15 individual tones.

10. The device according to claim 1 wherein each character is represented by a distinct dual tone.

11. The device according to claim 1 wherein calls are initiated by the device encoding at least a plurality of alpha or pictoragraphical characters related to an individual desired to be called, and generating different dual tones combinations for each different encoded character, and routing the calls over a Public Switched Telephone Network based on the generated dual tones combination.

12. The device according to claim 1 wherein pressing the characters "PD" would route calls a local police department and pressing the characters "FD" would route calls to a local fire department.

13. The device according to claim 1 wherein a plurality of dialing characters, and associated distinct dual tone combinations, are reserved for secure business, government, and military phones only.

14. A method of sending data from a dual-tone generating telecommunication device comprising a frequency generating element that produces at least 9 individual tones, each having a distinct frequency between 300 Hz and 3,000 Hz; at least 17 dial buttons, with each dial button representing at least one distinct character; each character directing the frequency generating element to produce a distinct dual tone, with each distinct dual tone being generated by the combination of two different individual tones; and a queue; the method comprising the steps of:

a call initiator encoding one or more characters into a queue representing an telephonic address of a destination device comprising;

in response to the telephonic address of the destination device being registered to a physical address in a different country than the call initiator, encoding a country code of one or more characters to represent the different country;

in response to the telephonic address of the destination device being registered to a physical address in a different state than the call initiator, encoding a state code of one or more characters to represent the different state;

in response to the telephonic address of the destination device being registered to a physical address in one of a different county and a different parish than the call initiator, encoding a county code of one or more characters to represent the different county or parish;

encoding one or more characters to represent an user of the destination device;

generating a distinct dual tone for each character, with at least 95 characters being each encoded with a distinct dual tone combination of less than 20 single tones with the distinct dual tones for the characters A, B, C, and D being at frequencies of 1633 Hz & 697 Hz; 1633 Hz & 770 Hz; 1633 Hz & 852 Hz; and 1633 Hz & 941 Hz, respectively; and transmitting the distinct dual tones to a telecommunications network.

15. The method of claim 14 further comprising the steps of generating a distinct digital value for each character and transmitting the digital values, and in response to the telephonic address of the destination device being registered to a physical address in one of a different city, a different town, and a different village than the call initiator, encoding a municipal code of one or more characters to represent the different city, town, or village.

16. The method of claim 15, further comprising the step of encoding characters in EBCDIC format
encoding one of at least 69 characters, and
pressing one of a dial button and a send button.

17. The method of claim 14, further comprising the steps of:

the country code being one of two and three letters long;
the state code being two letters long; and
the county code being two letters long.

18. The method of claim 14, further comprising the steps of:

displaying the encoded characters on a display one of before, during, or after the distinct dual tones are transmitted to the telecommunications network;

the country code being one of a United Nations ISO ALPHA 2 and a United Nations ISO ALPHA 3 abbreviation; and the state code being a Post Office state abbreviation.

19. A method of sending data from a dual-tone generating telecommunication device comprising a frequency generating element that produces at least 9 individual tones, each having a distinct frequency between 300 Hz and 3,000 Hz; at least 17 dial buttons, with each dial button representing at least one distinct character; each character directing the frequency generating element to produce a distinct dual tone, with each distinct dual tone being generated by the combination of two different individual tones; and a queue; the method comprising the steps of:

encoding one or more character into a queue;

generating a distinct dual tone for each character, with at least 95 characters being each encoded with a distinct dual tone combination of less than 20 single tones with the distinct dual tones for the characters A, B, C, and D being at frequencies of 1633 Hz & 697 Hz; 1633 Hz & 770 Hz; 1633 Hz & 852 Hz; and 1633 Hz & 941 Hz, respectively;

transmitting the distinct dual tones to a telecommunications network;

initiating a phone call;

routing the phone call based upon the transmitted distinct dual tones;

connecting to another telecommunications device;

in response to the device being directly connected to a residential telecommunications network, further encoding data in ASCII language;

in response to the device being directly connected to a military telecommunications network, further encoding data in EBCDIC language; and providing between 16 and 20 characters and between 16 and 20 associated dual tones that can only be encoded in response to the device being directly connected to the military telecommunications network.

* * * * *